United States Patent
Lin

(10) Patent No.: US 10,969,880 B1
(45) Date of Patent: Apr. 6, 2021

(54) MOUSE DEVICE

(71) Applicant: Chicony Electronics Co., Ltd., New Taipei (TW)

(72) Inventor: Chung-Yao Lin, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/905,937

(22) Filed: Jun. 19, 2020

(30) Foreign Application Priority Data

Feb. 5, 2020 (TW) .................................. 109103587

(51) Int. Cl.
*G06F 3/0354* (2013.01)

(52) U.S. Cl.
CPC .. *G06F 3/03543* (2013.01); *G06F 2203/0333* (2013.01)

(58) Field of Classification Search
CPC ..................... G06F 3/03543; G06F 2203/0333
USPC ....................................................... 345/163
See application file for complete search history.

(56) References Cited

U.S. PATENT DOCUMENTS

| | | | | |
|---|---|---|---|---|
| 8,054,292 B1* | 11/2011 | Forde | ................... | G06F 3/03543 345/163 |
| 2002/0084985 A1* | 7/2002 | Hesley | ................ | G06F 3/03543 345/163 |
| 2007/0125913 A1* | 6/2007 | Miller | ................. | G06F 3/03543 248/118 |
| 2012/0056812 A1* | 3/2012 | Chan | ................... | G06F 3/03543 345/163 |
| 2014/0210718 A1* | 7/2014 | Wang | .................. | G06F 3/03541 345/163 |
| 2019/0179430 A1* | 6/2019 | Shayani | .............. | G06F 3/03543 |

FOREIGN PATENT DOCUMENTS

TW         I291644 B    * 12/2007

* cited by examiner

*Primary Examiner* — Mark Edwards
(74) *Attorney, Agent, or Firm* — CKC & Partners Co., LLC

(57) ABSTRACT

A mouse device includes an operation body and a frame. The frame is engaged with the operation body and has a hollow portion. The hollow portion penetrates the mouse device from a side of the mouse device to another side of the mouse device. The frame includes two finger resting portions and a palm resting portion. The two finger resting portions are respectively located at opposite sides of the operation body. The palm resting portion is connected between the two finger resting portions. The hollow portion is formed among the two finger resting portions and the palm resting portion. In a forward-backward axial direction of the mouse device, the frame is located behind the operation body.

18 Claims, 11 Drawing Sheets

MOUSE DEVICE

CROSS-REFERENCE TO RELATED APPLICATION

This application claims priority to Taiwan Application Serial Number 109103587, filed Feb. 5, 2020, which is herein incorporated by reference.

BACKGROUND

Technical Field

The present disclosure relates to a mouse device.

Description of Related Art

As important external input devices of computers, mouse devices allow users to move cursors on computer screens quickly by moving the mouse devices and allow the users to perform quick input operations such as confirmation, cancellation, and the like by the operation of the mouse devices. Therefore, the mouse devices greatly improve convenience for the users to operate the computers.

It should be noted that after using a mouse device for a long time, it may cause a burden on the wrist and cause discomfort. Although some commercially available mouse devices can adjust the positions of the overall centers of gravity thereof by adding weight blocks (for example, using drawer-type weights for installation or removal), the purpose of the adjustment is to meet the needs of the user's operating feel and cannot effectively alleviate the aforementioned discomfort.

Accordingly, how to provide a mouse device to solve the aforementioned problems becomes an important issue to be solved by those in the industry.

SUMMARY

An aspect of the disclosure is to provide a mouse device that can efficiently solve the aforementioned problems.

According to an embodiment of the disclosure, a mouse device includes an operation body and a frame. The frame is engaged with the operation body and has a hollow portion. The hollow portion penetrates the mouse device from a side of the mouse device to another side of the mouse device. The frame includes two finger resting portions and a palm resting portion. The two finger resting portions are respectively located at opposite sides of the operation body. The palm resting portion is connected between the two finger resting portions. The hollow portion is formed among the two finger resting portions and the palm resting portion. In a forward-backward axial direction of the mouse device, the frame is located behind the operation body.

In an embodiment of the disclosure, a length of the frame in the forward-backward axial direction is greater than a length of the operation body in the forward-backward axial direction.

In an embodiment of the disclosure, the hollow portion penetrates the mouse device in an upward-downward axial direction of the mouse device.

In an embodiment of the disclosure, the hollow portion penetrates the mouse device in a left-right axial direction of the mouse device.

In an embodiment of the disclosure, the hollow portion penetrates the mouse device in an upward-downward axial direction and a left-right axial direction of the mouse device.

In an embodiment of the disclosure, the frame further includes a supporting portion connected to an end of the palm resting portion away from the operation body. The supporting portion extends toward the operation body.

In an embodiment of the disclosure, the palm resting portion is located behind the two finger resting portions in the forward-backward axial direction.

In an embodiment of the disclosure, the frame further includes two connecting portions. The two finger resting portions are connected to the palm resting portion respectively through the two connecting portions.

In an embodiment of the disclosure, each of the two connecting portions forms a part of a bottom of the mouse device.

In an embodiment of the disclosure, at least one of the two connecting portions has at least one through hole.

In an embodiment of the disclosure, the hollow portion is adjoined between a part of the palm resting portion away from the operation body and the two connecting portions in the forward-backward axial direction.

In an embodiment of the disclosure, the frame further includes an engaging portion. The engaging portion is connected between the two finger resting portions and engaged with a bottom of the operation body.

In an embodiment of the disclosure, the engaging portion forms a part of a bottom of the mouse device.

In an embodiment of the disclosure, the palm resting portion has at least one through hole.

In an embodiment of the disclosure, the hollow portion is adjoined between the operation body and the palm resting portion in the forward-backward axial direction.

In an embodiment of the disclosure, the mouse device further includes a weight member. The weight member is located at the hollow portion and detachably engaged with the frame.

In an embodiment of the disclosure, the mouse device further includes a battery compartment. The battery compartment is located at the hollow portion and detachably engaged with the operation body.

In an embodiment of the disclosure, the mouse device further includes a weight member. The weight member is located at the hollow portion and detachably engaged with the battery compartment.

In an embodiment of the disclosure, the battery compartment has a slot. The weight member is detachably inserted into the slot.

In an embodiment of the disclosure, the operation body has a connection port having an engaging block therein. The battery compartment is detachably engaged with the connection port and has an engaging groove. The engaging block is slidably engaged with the engaging groove.

Accordingly, in the mouse device of the present disclosure, the operation body and the frame are respectively located at the front and rear of the mouse device in the forward-backward axial direction of the mouse device. Therefore, functional operating elements of the mouse device (e.g., the buttons, the scroll wheel, the touchpad, etc.) and electronic components (e.g., the circuit board, the light emitter, the light receiver, etc.) can be integrated and concentrated in the front operating body, and the rear frame can be used to support the palm of a user. In addition, the hollow portion of the frame has a structure that penetrates from one side to the other side of the mouse device, which can effectively reduce the weight of the frame, thereby achieving the weight reduction of the mouse device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
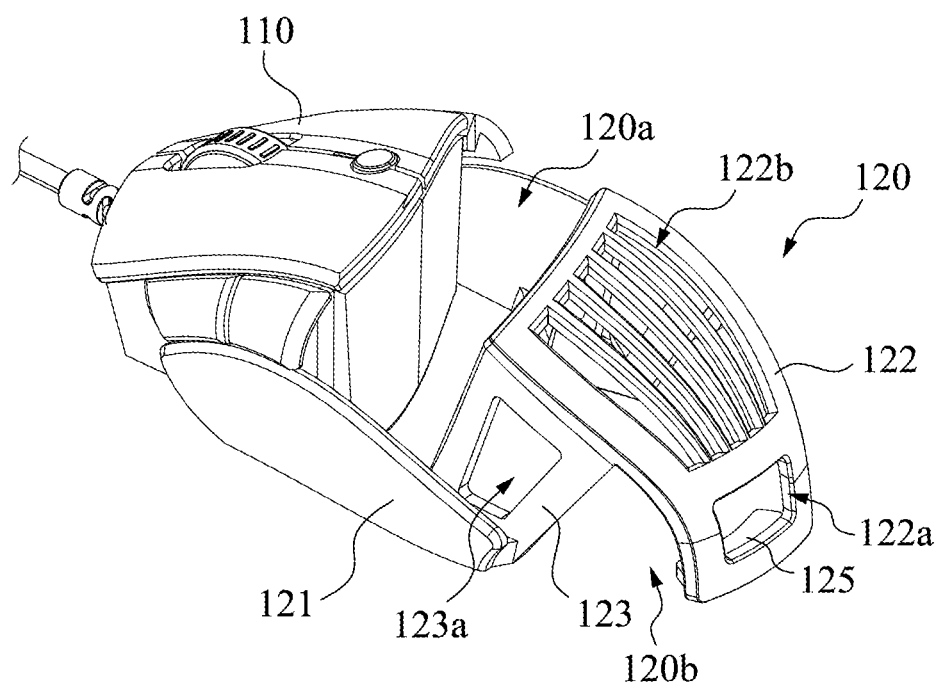
FIG. 1A is a perspective view of a mouse device according to an embodiment of the disclosure.
Figure 1A:
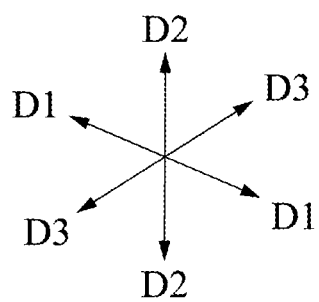

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1B:
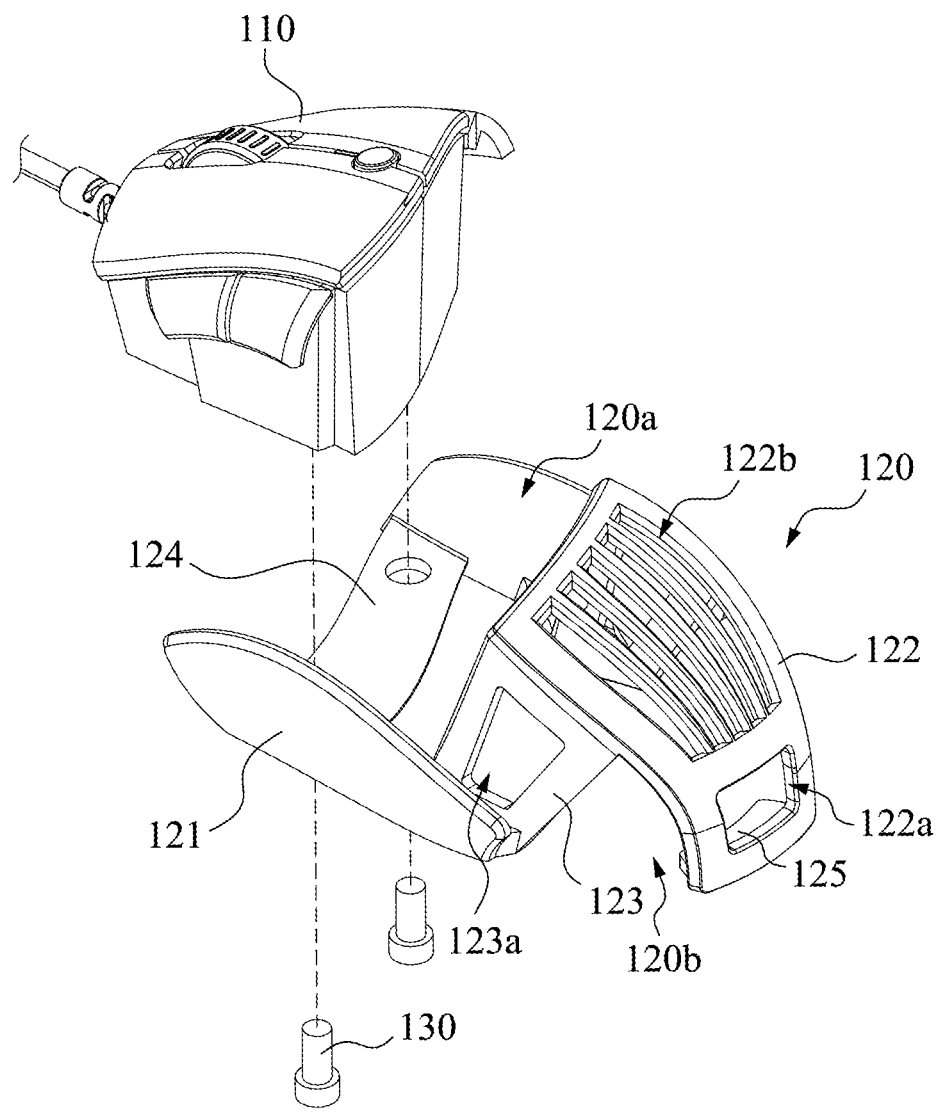
FIG. 1B is an exploded view of the mouse device in FIG. 1A.
Figure 1B:
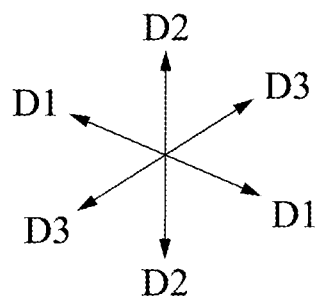
Figure 2:
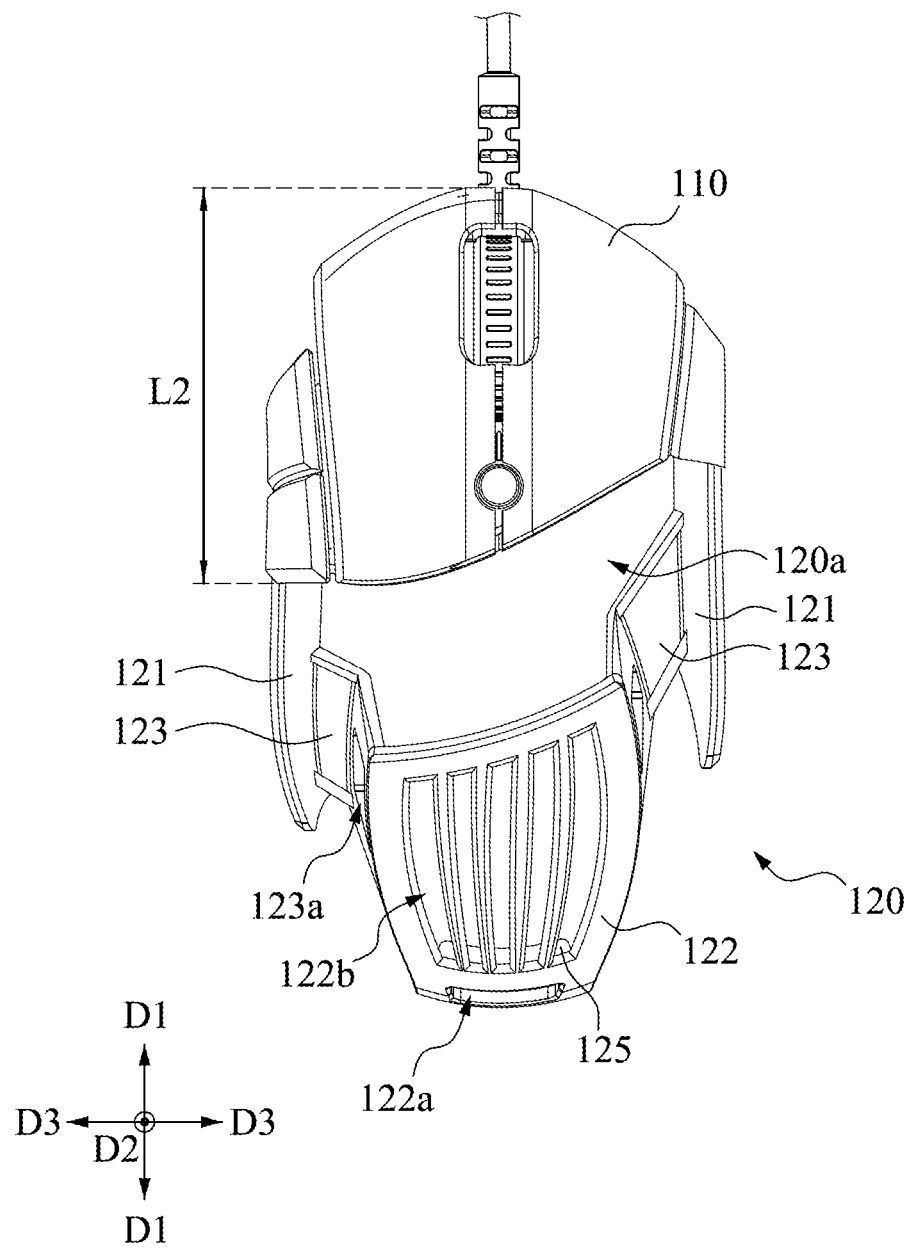
FIG. 2 is a top view of the mouse device in FIG. 1A.
Figure 3:
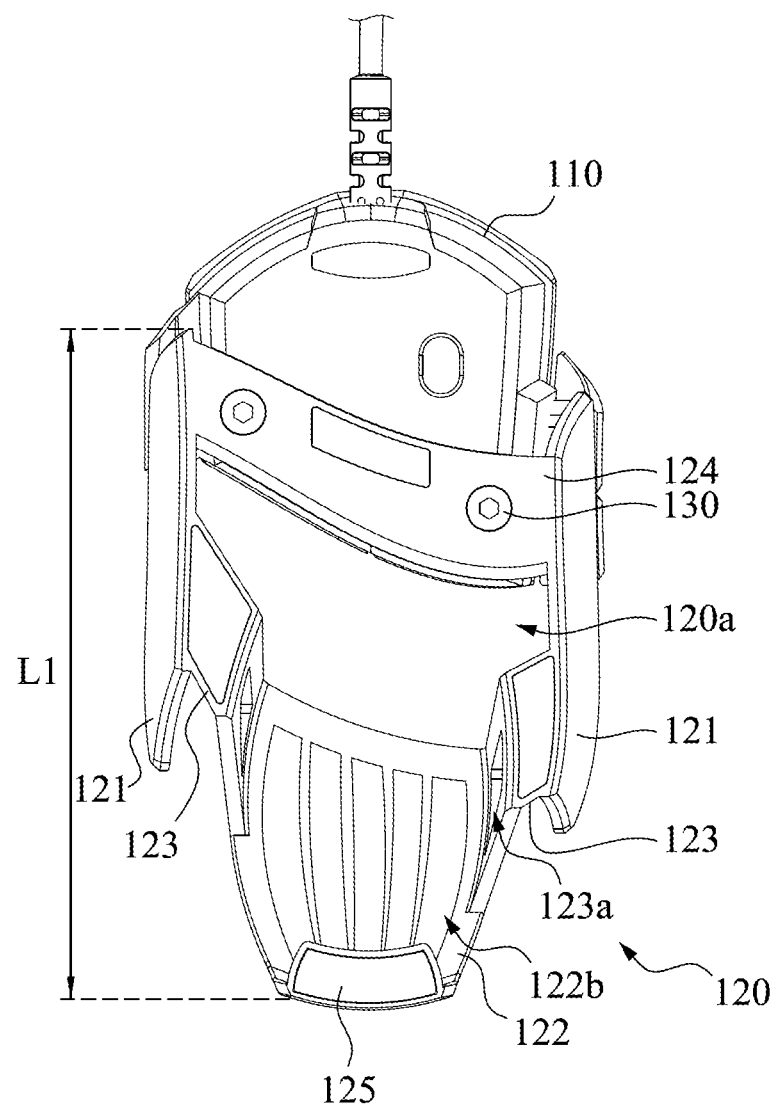
FIG. 3 is a bottom view of the mouse device in FIG. 1A.
Figure 4:
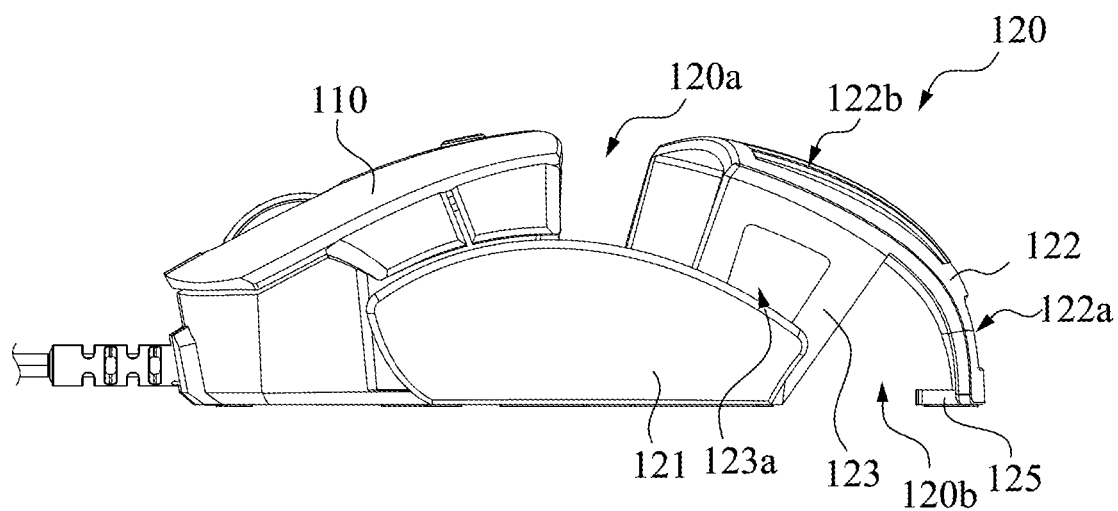
FIG. 4 is a side view of the mouse device in FIG. 1A.
Figure 4:
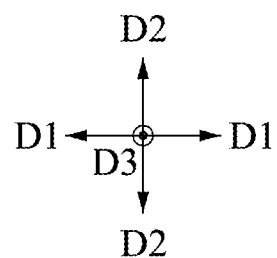

Reference is made to FIG. 1 to FIG. 4. FIG. 1A is a perspective view of a mouse device 100 according to an embodiment of the disclosure. FIG. 1B is an exploded view of the mouse device 100 in FIG. 1A. FIG. 2 is a top view of the mouse device 100 in FIG. 1A. FIG. 3 is a bottom view of the mouse device in FIG. 1A. FIG. 4 is a side view of the mouse device 100 in FIG. 1A. As shown in FIGS. 1 to 4, in the present embodiment, the mouse device 100 includes an operation body 110 and a frame 120. The operation body 110 may be provided with functional operating elements (e.g., buttons, a scroll wheel, a touch pad, etc.) for a user's hand to operate. Electronic components (e.g., a circuit board, a light emitter, a light receiver, etc.) may be provided inside the operation body 110 to convert operations of the user on the aforementioned functional operating elements into input signals. The frame 120 is engaged with the operation body 110 and can be used to support the palm of the user. The frame 120 has hollow portions 120a, 120b. Each of the hollow portions 120a, 120b penetrates the mouse device 100 from a side of the mouse device 100 to another side of the mouse device 100. In a forward-backward axial direction D1 of the mouse device 100, the frame 120 is located behind the operation body 110.

For example, as shown in FIGS. 2 and 3, the hollow portion 120a of the frame 120 penetrates the mouse device 100 in an upward-downward axial direction D2 of the mouse device 100. That is, the hollow portion 120a penetrates from the top side of the mouse device 100 to the bottom side of the mouse device 100. In some embodiments, the upward-downward axial direction D2 of the mouse device 100 is perpendicular to a bottom surface of the mouse device 100, but the present disclosure is not limited in this regard.

For example, as shown in FIG. 4, the hollow portions 120a, 120b penetrate the mouse device 100 in a left-right axial direction D3 of the mouse device 100. That is, the hollow portions 120a, 120b penetrate from the left side of the mouse device 100 to the right side of the mouse device 100. In some embodiments, the left-right axial direction D3 of the mouse device 100 is parallel to the bottom surface of the mouse device 100 and perpendicular to the upward-downward axial direction D2, but the present disclosure is not limited in this regard.

In some other embodiments, the frame 120 may only have a hollow portion penetrating the mouse device 100 in the upward-downward axial direction D2 of the mouse device 100, or only a hollow portion penetrating the mouse device 100 in the left-right axial direction D3.

In some other embodiments, the frame 120 may only have a hollow portion penetrating from the top side/bottom side of the mouse device 100 to one of the left and right sides of the mouse device 100.

With the foregoing structural configurations, the volume of the operation body 110 integrating the functional operating elements and the electronic components can be reduced toward the front half of the mouse device 100, and the frame 120 having the hollow portions 120a, 120b can be extended to the rear half of the mouse device 100, thereby achieving the weight reduction of the mouse device 100.

In some embodiments, as shown in FIGS. 2 and 3, a length L1 of the frame 120 in the forward-backward axial direction D1 is greater than a length L2 of the operation body 110 in the forward-backward axial direction D1. With the structural configuration, the aforementioned effect of reducing the weight of the mouse device 100 can be made more significant.

As shown in FIGS. 1A to 4, in the present embodiment, the frame 120 includes two finger resting portions 121 and a palm resting portion 122. The two finger resting portions 121 are respectively located at opposite sides of the operation body 110. The palm resting portion 122 is connected between the two finger resting portions 121. The hollow portion 120a is formed among the two finger resting portions 121 and the palm resting portion 122, and is adjoined between the operation body 110 and the palm resting portion 122 in the forward-backward axial direction D1. For example, one of the finger resting portions 121 can be used to support the thumb of the user, and the other finger resting portions 121 can be used to support at least the ring finger and the little finger of the user. The palm resting portion 122 can be used to support the palm of the user.

In some embodiments, the palm resting portion 122 is located behind the two finger resting portions 121 in the forward-backward axial direction D1 of the mouse device 100. With the structural configuration, in addition to making the frame 120 better ergonomically fit the positions of the user's fingers and palm, the volume of the frame 120 can be reduced as much as possible, so that the aforementioned effect of reducing the weight of the mouse device 100 is more significant. In addition, the palm resting portion 122 has a plurality of through holes 122a, 122b, so as to achieve the purpose of reducing the weight of the mouse device 100. As shown in FIG. 1A, the palm resting portion 122 has a through hole 122a penetrating the palm resting portion 122 in the forward-backward axial direction D1, and has a plurality of through holes 122b penetrating the palm resting portion 122 in the upward-downward axial direction D2. The opening area of the through hole 122a is larger than the opening area of any of the through holes 122b, but the present disclosure is not limited in this regard.

In some embodiments, as shown in FIGS. 3 and 4, a bottom surface of the operation body 110 forms a part of a bottom of the mouse device 100. Hence, when the user uses the mouse device 100 on an operation surface (e.g., a desktop), the operation body 110 can slide on the operation surface. In addition, the palm resting portion 122 also forms a part of the bottom of the mouse device 100. Specifically, the frame 120 further includes a supporting portion 125. The supporting portion 125 is connected to an end of the palm resting portion 122 away from the operation body 110 and extends toward the operation body 110. Hence, when the user uses the mouse device 100 on this operation surface, the supporting portion 125 located behind the mouse device 100 can contact the operation surface, and can avoid the problem that the operation body 110 in the front is lifted up because the palm resting portion 122 is pressed down by the palm of the user. In addition, foot pads (e.g., wear-resistant pads) may be provided on the bottom surface of the operation body 110 and the bottom surface of the supporting portion 125.

As shown in FIGS. 1A to 4, in the present embodiment, the frame 120 further includes two connecting portions 123. The two finger resting portions 121 are connected to the palm resting portion 122 respectively through the two connecting portions 123. Specifically, the two connecting portions 123 extend from the bottoms of the two finger resting portions 121 along the left-right axial direction D3, and are connected upward to the palm resting portion 122 along the upward-downward axial direction D2. The hollow portion 120b is adjoined between a part of the palm resting portion 122 away from the operation body 110 and the two connecting portions 123 in the forward-backward axial direction D1. In addition, each of the two connecting portions 123 has a plurality of through holes 123a, so as to achieve the purpose of reducing the weight of the mouse device 100. As shown in FIG. 1A, for each connecting portion 123, there is a through hole 123a penetrating the connecting portion 123 in the left-right axial direction D3, but the present disclosure is not limited in this regard.

As shown in FIG. 3, each of the two connecting portions 123 forms a part of the bottom of the mouse device 100. Hence, when the user uses the mouse device 100 on the operation surface, the connecting portions 123 located on the left and right sides of the mouse device 100 can contact the operation surface, and the problem that the mouse device 100 is tilted to the left and right sides thereof during operation can be avoided. In addition, foot pads (e.g., wear-resistant pads) may be provided on bottom surfaces of the connecting portions 123.

As shown in FIGS. 1B and 3, in the present embodiment, the frame 120 further includes an engaging portion 124. The engaging portion 124 is connected between the two finger resting portions 121 and engaged with the bottom of the operation body 110. Specifically, the mouse device 100 further includes screws 130. The screws 130 are fixed to the bottom of the operation body 110 through holes of the engaging portion 124. In addition, the screws 130 completely sink into the holes of the engaging portion 124 without protruding from the bottom of the mouse device 100, as shown in FIG. 4.

In practical applications, the frame 120 may also cancel the aforementioned engaging portion 124, and the two finger resting portions 121 may be respectively engaged with both sides of the operation body 110 by means of engagement. As such, the purpose of detachably connecting the frame 120 to the operation body 110 can still be achieved.

As shown in FIG. 3, the engaging portion 124 forms a part of the bottom of the mouse device 100. Hence, when the user uses the mouse device 100 on the operation surface, the engaging portion 124 located at the bottom of the operation body 110 can contact the operation surface, and can avoid excessive wear of the bottom of the operation body 110 after long-term use. In addition, foot pads (e.g., wear-resistant pads) may be provided on a bottom surface of the engaging portion 124.

Figure 5:
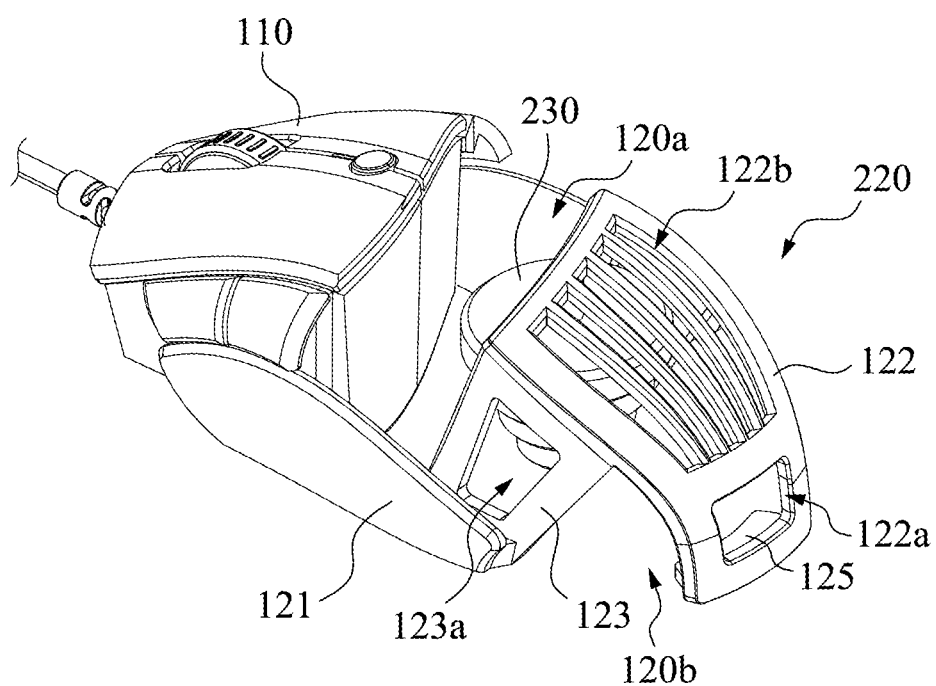
FIG. 5 is a perspective view of a mouse device according to an embodiment of the disclosure.
Figure 5:
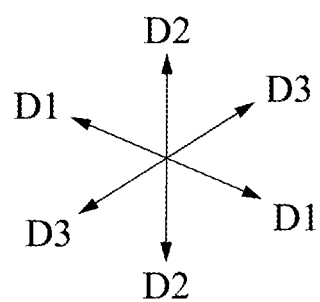
Figure 6:
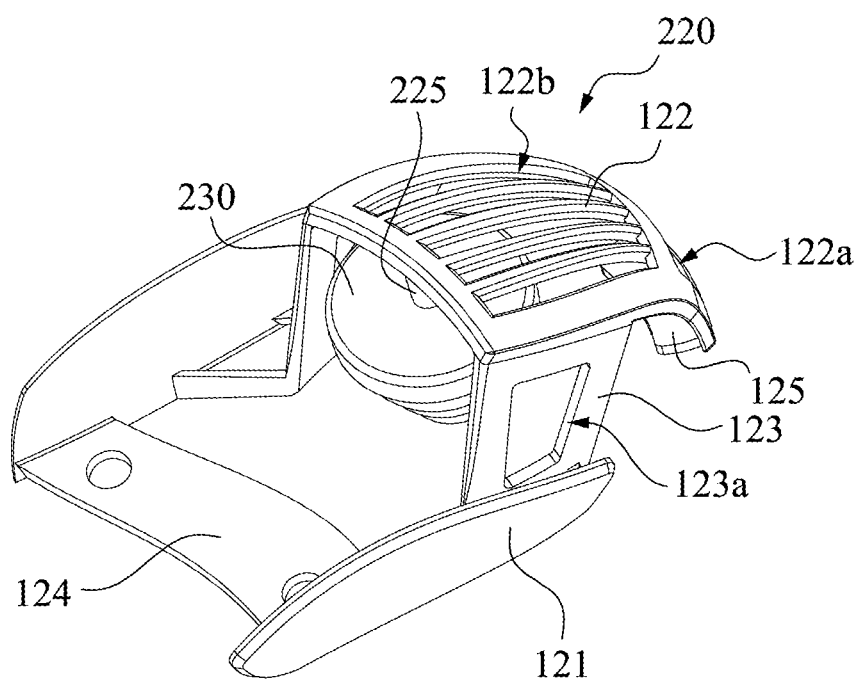
FIG. 6 is a perspective view of some components of the mouse device in FIG. 5.

Reference is made to FIGS. 5 and 6. FIG. 5 is a perspective view of a mouse device 200 according to an embodiment of the disclosure. FIG. 6 is a perspective view of some components of the mouse device 200 in FIG. 5. Differences between the present embodiment and the embodiment shown in FIG. 1A are that the mouse device 200 of the present embodiment further includes one or more weight members 230, and the frame 220 further includes a suspension portion 225. The weight members 230 are located at the hollow portions 120a, 120b and detachably engaged with the suspension portion 225 of the frame 220. Specifically, the suspension portion 225 is connected to the below the palm resting portion 122 and has a columnar shape. The weight members 230 are sheet-shaped and can pass through the suspension portion 225 to be hung on the suspension portion 225. Hence, the user can arbitrarily select the number and weight of the weight members 230 to be suspended to adjust the overall position of the center of gravity of the mouse device 200, so that the mouse device 200 can meet the operation feel requirements of the user.

Figure 7:
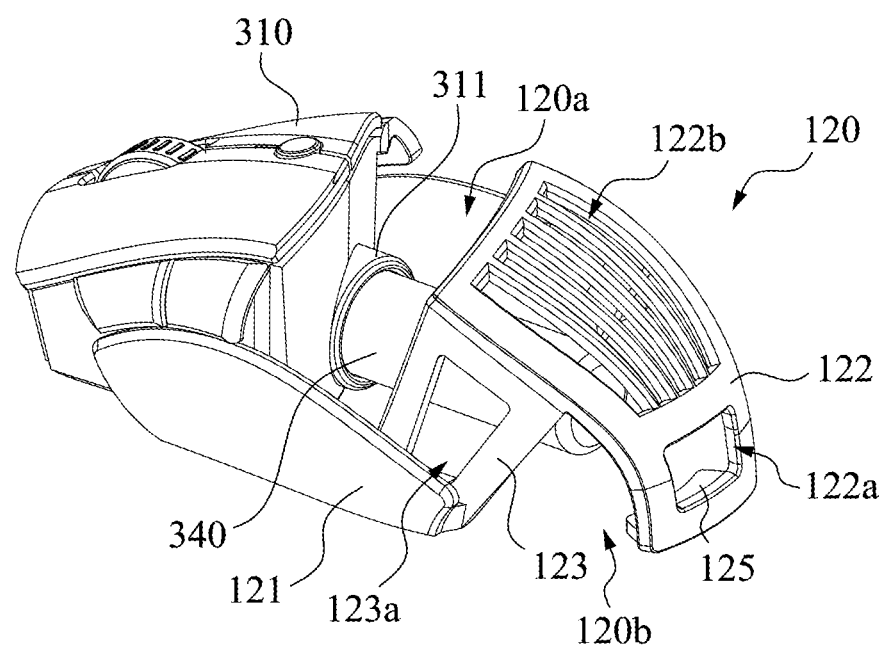
FIG. 7 is a perspective view of a mouse device according to an embodiment of the disclosure.
Figure 7:
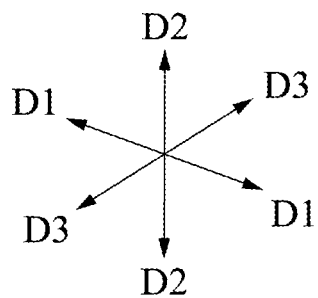
Figure 8:
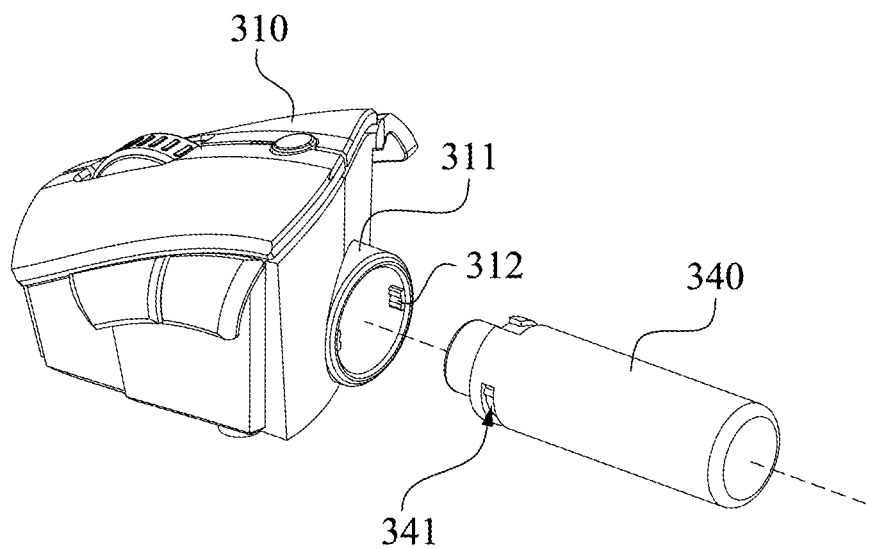
FIG. 8 is an exploded view of some components of the mouse device in FIG. 7.

Reference is made to FIGS. 7 and 8. FIG. 7 is a perspective view of a mouse device 300 according to an embodiment of the disclosure. FIG. 8 is an exploded view of some components of the mouse device 300 in FIG. 7. Differences between the present embodiment and the embodiment shown in FIG. 1A are that the mouse device 300 of the present embodiment further includes a battery compartment 340, and the operation body 310 has a connection port 311. The battery compartment 340 is located at the hollow portions 120a, 120b and detachably engaged with the connection port 311 of the operation body 310. The battery compartment 340 can be provided with a battery for supplying power to the electronic components inside the operation body 310 through the connection port 311. In other words, the mouse device 100 shown in FIG. 1A may be a wired mouse, and the mouse device 300 of the present embodiment may be a wireless mouse provided with power from the battery in the battery compartment 340. In addition, the configuration in which the frame 120 is detachably engaged with the operation body 310 and the configuration in which the battery compartment 340 is detachably engaged with the operation body 310 can achieve the effect of facilitating battery replacement.

In some embodiments, as shown in FIG. 8, the connection port 311 of the operation body 310 has an engaging block 312 therein, and the battery compartment 340 is substantially cylindrical and has an engaging groove 341. An entrance of the engaging groove 341 is located at an end of the battery compartment 340. The engaging groove 341 extends from the entrance substantially parallel to a central axis of the battery compartment 340 and then extends axially around the central axis of the battery compartment 340. With the structural configuration, the battery compartment 340 can be inserted into the connection port 311 of the operation body 310, and then the battery compartment 340 can be rotated to slide and engage the engaging block 312 with a distal end of the engaging groove 341, thereby engaging the battery compartment 340 to the operation body 310.

Figure 9:
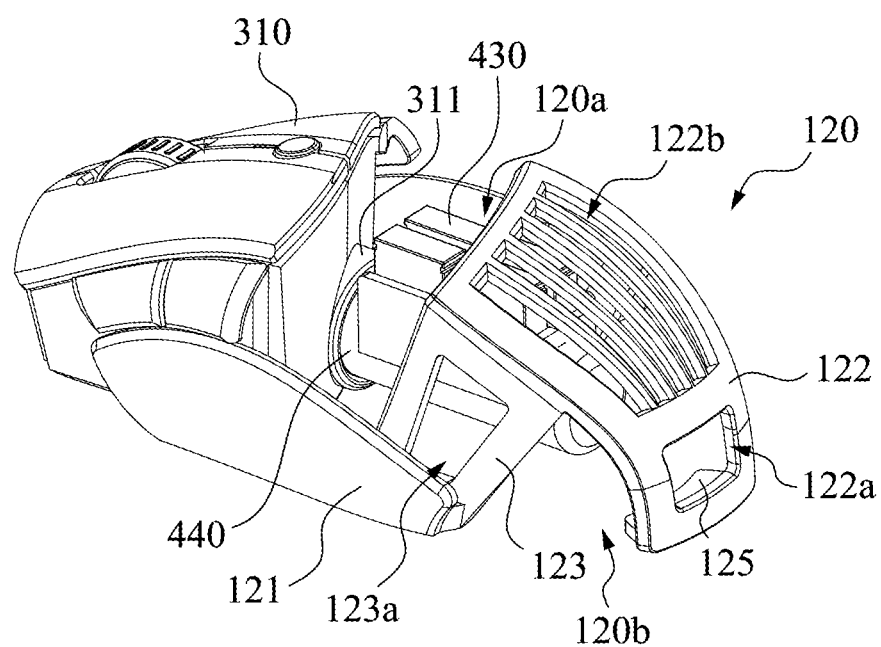
FIG. 9 is a perspective view of a mouse device according to an embodiment of the disclosure.
Figure 9:
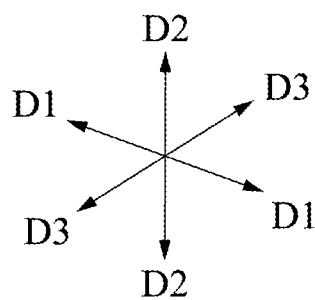
Figure 10:
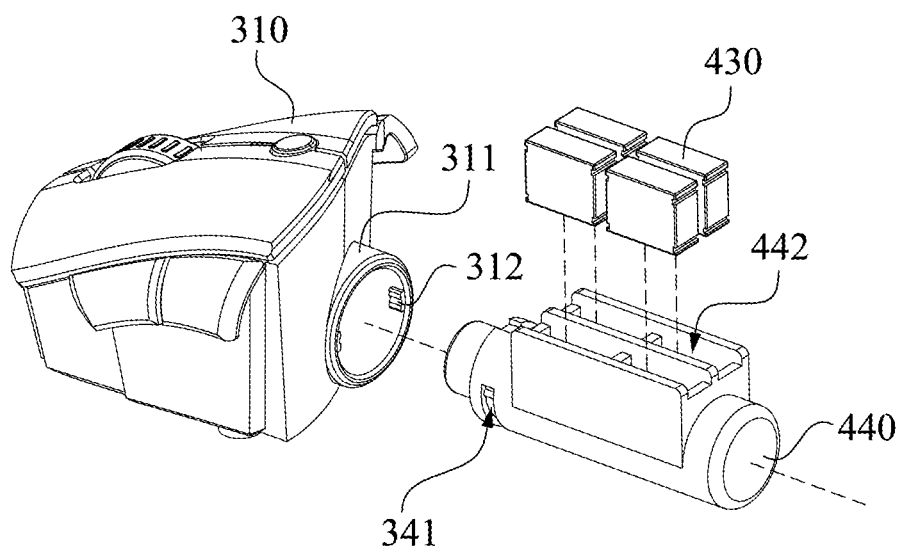
FIG. 10 is an exploded view of some components of the mouse device in FIG. 9.

Reference is made to FIGS. 9 and 10. FIG. 9 is a perspective view of a mouse device 400 according to an embodiment of the disclosure. FIG. 10 is an exploded view of some components of the mouse device 400 in FIG. 9. Differences between the present embodiment and the embodiments shown in FIGS. 5 and 7 are that the battery compartment 440 of the mouse device 400 of the present embodiment has one or more slots 442, and the mouse device 400 further includes one or more weight members 430. The weight members 430 are located at the hollow portions 120a, 120b and detachably inserted into the slots 442 of the battery compartment 440. Hence, the user can arbitrarily select the number and weight of the weight members 430 to be suspended to adjust the overall position of the center of gravity of the mouse device 400, so that the mouse device 400 can meet the operation feel requirements of the user. In addition, the configuration in which the frame 120 is detachably engaged with the operation body 310 and the configuration in which the battery compartment 440 is detachably engaged with the operation body 310 can achieve the effect of facilitating battery replacement.

According to the foregoing recitations of the embodiments of the disclosure, it can be seen that in the mouse device of the present disclosure, the operation body and the frame are respectively located at the front and rear of the mouse device in the forward-backward axial direction of the mouse device. Therefore, functional operating elements of the mouse device (e.g., the buttons, the scroll wheel, the touchpad, etc.) and electronic components (e.g., the circuit board, the light emitter, the light receiver, etc.) can be integrated and concentrated in the front operating body, and the rear frame can be used to support the palm of a user. In addition, the hollow portion of the frame has a structure that penetrates from one side to the other side of the mouse device, which can effectively reduce the weight of the frame, thereby achieving the weight reduction of the mouse device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mouse device, comprising:
   an operation body; and
   a frame engaged with the operation body and having a hollow portion, wherein the hollow portion penetrates the mouse device from a side of the mouse device to another side of the mouse device, and the frame comprises:
   two finger resting portions respectively located at opposite sides of the operation body;
   a palm resting portion connected between the two finger resting portions, wherein the hollow portion is surrounded by the two finger resting portions and the palm resting portion; and
   two connecting portions, wherein the two finger resting portions are connected to the palm resting portion respectively through the two connecting portions, and each of the two connecting portions forms a part of a bottom of the mouse device,
   wherein in a forward-backward axial direction of the mouse device, the frame is located behind the operation body.

2. The mouse device of claim 1, wherein a length of the frame in the forward-backward axial direction is greater than a length of the operation body in the forward-backward axial direction.

3. The mouse device of claim 1, wherein the hollow portion penetrates the mouse device in an upward-downward axial direction of the mouse device.

4. The mouse device of claim 1, wherein the hollow portion penetrates the mouse device in a left-right axial direction of the mouse device.

5. The mouse device of claim 1, wherein the hollow portion penetrates the mouse device in an upward-downward axial direction and a left-right axial direction of the mouse device.

6. The mouse device of claim 1, wherein the frame further comprises a supporting portion connected to an end of the palm resting portion away from the operation body, and the supporting portion extends toward the operation body.

7. The mouse device of claim 1, wherein the palm resting portion is located behind the two finger resting portions in the forward-backward axial direction.

8. The mouse device of claim 1, wherein at least one of the two connecting portions has at least one through hole.

9. The mouse device of claim 1, wherein the frame further comprises an engaging portion, and the engaging portion is connected between the two finger resting portions and engaged with a bottom of the operation body.

10. The mouse device of claim 9, wherein the engaging portion forms a part of the bottom of the mouse device.

11. The mouse device of claim 1, wherein the palm resting portion has at least one through hole.

12. The mouse device of claim 1, wherein the hollow portion is adjoined between the operation body and the palm resting portion in the forward-backward axial direction.

13. The mouse device of claim 1, further comprising a weight member located at the hollow portion and detachably engaged with the frame.

14. The mouse device of claim 1, further comprising a battery compartment located at the hollow portion and detachably engaged with the operation body.

15. The mouse device of claim 14, further comprising a weight member located at the hollow portion and detachably engaged with the battery compartment.

16. The mouse device of claim 15, wherein the battery compartment has a slot, and the weight member is detachably inserted into the slot.

17. A mouse device, comprising:
   an operation body; and
   a frame engaged with the operation body and having a hollow portion, wherein the hollow portion penetrates the mouse device from a side of the mouse device to another side of the mouse device, and the frame comprises:

two finger resting portions respectively located at opposite sides of the operation body;

a palm resting portion connected between the two finger resting portions, wherein the hollow portion is surrounded by the two finger resting portions and the palm resting portion; and two connecting portions, wherein the two finger resting portions are connected to the palm resting portion respectively through the two connecting portions, and the hollow portion is adjoined between a part of the palm resting portion away from the operation body and the two connecting portions in the forward-backward axial direction, wherein in a forward-backward axial direction of the mouse device, the frame is located behind the operation body.

18. A mouse device, comprising:

an operation body having a connection port having an engaging block therein;

a frame engaged with the operation body and having a hollow portion, wherein the hollow portion penetrates the mouse device from a side of the mouse device to another side of the mouse device, and the frame comprises:

two finger resting portions respectively located at opposite sides of the operation body; and a palm resting portion connected between the two finger resting portions, wherein the hollow portion is surrounded by the two finger resting portions and the palm resting portion; and a battery compartment located at the hollow portion and detachably engaged with the connection port, wherein the battery compartment has an engaging groove, and the engaging block is slidably engaged with the engaging groove, wherein in a forward-backward axial direction of the mouse device, the frame is located behind the operation body.

* * * * *